(12) United States Patent
Nishida

(10) Patent No.: US 10,479,183 B2
(45) Date of Patent: Nov. 19, 2019

(54) HYBRID VEHICLE

(71) Applicant: TOYOTA JIDOSHA KABUSHIKI KAISHA, Toyota-shi, Aichi-ken (JP)

(72) Inventor: Hideyuki Nishida, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/119,314

(22) Filed: Aug. 31, 2018

(65) Prior Publication Data
US 2019/0070948 A1 Mar. 7, 2019

(30) Foreign Application Priority Data
Sep. 5, 2017 (JP) ................................. 2017-170356

(51) Int. Cl.
| | |
|---|---|
| *B60K 6/26* | (2007.10) |
| *B60K 6/44* | (2007.10) |
| *B60K 6/387* | (2007.10) |
| *B60K 6/405* | (2007.10) |
| *B60K 6/48* | (2007.10) |

(Continued)

(52) U.S. Cl.
CPC .............. *B60K 6/44* (2013.01); *B60K 6/26* (2013.01); *B60K 6/38* (2013.01); *B60K 6/387* (2013.01); *B60K 6/405* (2013.01); *B60K 6/48* (2013.01); *B60K 6/52* (2013.01); *B60K 6/547* (2013.01); *F16H 57/04* (2013.01); *B60K 2006/4825* (2013.01); *B60Y 2200/92* (2013.01); *B60Y 2300/202* (2013.01); *B60Y 2306/03* (2013.01); *B60Y 2400/42* (2013.01); *B60Y 2400/48* (2013.01); *F16F 15/1407* (2013.01)

(58) Field of Classification Search
CPC ... B60K 6/48; B60K 6/26; B60K 6/38; B60K 6/405; B60K 6/44; B60K 6/52; F16H 57/04
See application file for complete search history.

(56) References Cited

U.S. PATENT DOCUMENTS

| | | |
|---|---|---|
| 2004/0204286 A1 | 10/2004 | Stridsberg |
| 2009/0186734 A1 | 7/2009 | Perkins |

(Continued)

FOREIGN PATENT DOCUMENTS

| | | | | |
|---|---|---|---|---|
| DE | 102016202828 A1 | * | 8/2017 | ............... B60K 6/30 |
| JP | 2009173272 A | | 8/2009 | |

(Continued)

OTHER PUBLICATIONS

U.S. Appl. No. 16/055,687, filed Aug. 6, 2018.
"Two-Mass Flywheel Luk With a Shuttle-Type Damper", Auto-ExpertConsulting.Com, (Sep. 1, 2014), 6 pages total.

*Primary Examiner* — Bryan A Evans
(74) *Attorney, Agent, or Firm* — Hunton Andrews Kurth LLP

(57) ABSTRACT

A hybrid vehicle having a pendulum damper in which resonance at around an idling speed of an engine can be prevented to improve N.V. performance. The hybrid vehicle comprises an engine and at least one motor. In the hybrid vehicle, a power transmission path is formed between the engine and drive wheels. In the power transmission path, a pendulum damper is disposed to suppress torsional vibrations, and a disconnecting clutch is disposed to selectively interrupt power transmission between the engine and the pendulum damper.

8 Claims, 14 Drawing Sheets

(51) Int. Cl.
  *B60K 6/547*   (2007.10)
  *B60K 6/38*    (2007.10)
  *B60K 6/52*    (2007.10)
  *F16H 57/04*   (2010.01)
  *F16F 15/14*   (2006.01)

(56) References Cited

U.S. PATENT DOCUMENTS

2012/0055283 A1     3/2012   Moser
2017/0028845 A1 *   2/2017   Ohkawa ............... B60K 17/344
2017/0314639 A1    11/2017   Maienschein et al.

FOREIGN PATENT DOCUMENTS

| JP | 2017144914 A | 8/2017 |
| KR | 20170050491 A | 5/2017 |
| WO | 9921263 A2 | 4/1999 |
| WO | 2008025691 A1 | 3/2008 |
| WO | 2016070878 A1 | 5/2016 |

* cited by examiner

HYBRID VEHICLE

CROSS REFERENCE TO RELATED APPLICATIONS

The present disclosure claims the benefit of Japanese Patent Application No. 2017-170356 filed on Sep. 5, 2017 with the Japanese Patent Office, the disclosure of which are incorporated herein by reference in its entirety.

BACKGROUND

Field of the Disclosure

Embodiments of the present disclosure relate to the art of a hybrid vehicle in which a prime mover includes an engine and a motor. More specifically, the embodiments of the present disclosure relate to hybrid vehicle comprising a clutch for selectively disconnecting an engine from a power transmission path, and a pendulum damper for suppressing torsional vibration on the power transmission path.

Discussion of the Related Art

US 2012/0055283 A describes a hybrid vehicle comprising a torsional vibration damper. In the hybrid vehicle taught by US 2012/0055283 A, a motor is disposed on an output side of an engine, and a transmission is disposed on an output side of the motor. A clutch is disposed between the engine and the motor to selectively provide a connection therebetween. A first spring damping system is arranged between the engine and the clutch, and a second spring damping system is arranged between the motor and the transmission. The first spring damping system serves as the torsional vibration damper together with a centrifugal pendulum to absorb vibration of a power transmission path by an oscillating motion of the centrifugal pendulum.

In the hybrid vehicle taught by US 2012/0055283, specifically, the torsional vibration damper is arranged closer to the engine than the clutch. That is, in the power transmission path between the engine and the clutch, the spring damping system and the centrifugal pendulum are connected to the engine. Consequently, a natural vibration frequency is reduced by an inertial mass of the centrifugal pendulum. If the natural vibration frequency is reduced close to a vibration frequency of the engine at an idling speed, a resonance may occur during operation of the engine at the idling speed, or when starting or stopping the engine. For this reason, N.V. performance of the vehicle may be reduced.

SUMMARY

Aspects of embodiments of the present disclosure have been conceived noting the foregoing technical problems, and it is therefore an object of the present disclosure to improve N.V. performance of a hybrid vehicle having a pendulum damper, by avoiding a resonance at around an idling speed of an engine, and by suppressing vibrations on a power transmission path.

In the hybrid vehicle according to at least one embodiment of the present disclosure, a prime mover includes an engine and at least one motor. The hybrid vehicle comprises: a drive wheel; a power transmission path from the engine to the drive wheel via the motor; a pendulum damper that is arranged on the power transmission path to absorb torsional vibrations on the power transmission path; and a disconnecting clutch that is arranged on the power transmission path to selectively interrupt power transmission between the engine and the pendulum damper.

In a non-limiting embodiment, the disconnecting clutch may be disengaged to interrupt power transmission between the engine and the pendulum damper at least in cases of starting the engine, stopping the engine, operating the engine at around a predetermined speed.

In a non-limiting embodiment, the disconnecting clutch may be disposed between the engine and the motor, and the pendulum damper may be disposed closer to the drive wheel than the disconnecting clutch.

In a non-limiting embodiment, the motor may include a motor case holding a motor oil for lubricating at least the motor. The pendulum damper may be arranged in the motor case together with at least the motor and the pendulum damper may be lubricated by the motor oil.

In a non-limiting embodiment, the motor may include a coil end as a portion of a coil protruding in an axial direction from an axial end of a stator of the motor, and the pendulum damper may be held in an inner circumferential space of the coil end.

In a non-limiting embodiment, the motor may include a motor case holding a motor oil for lubricating at least the motor, and the disconnecting clutch may be arranged in the motor case together with at least the motor.

In a non-limiting embodiment, the motor may include a rotor, and the disconnecting clutch may be arranged in a hollow space of the rotor.

In a non-limiting embodiment, the hybrid vehicle may comprise a transmission that is arranged on the power transmission path to transmit torque to the drive wheel with a predetermined speed ratio, and that is selectively brought into neutral stage. The transmission may include a clutch that is selectively engaged and disengaged to establish the predetermined speed ratio and the neutral stage, and the transmission may serve as the disconnecting clutch.

In a non-limiting embodiment, the drive wheel may include a pair of front wheels and a pair of rear wheels. The hybrid vehicle may further comprise a transfer that is disposed on the power transmission path. The transfer may be adapted to switch a drive mode between two-wheel drive mode in which a drive torque is delivered to any one of the pairs of the front wheels and the rear wheels, and four-wheel drive mode in which a drive torque is delivered to both pairs of the front wheels and the rear wheels. Instead, the drive mode may be fixed to the four-wheel drive mode. In addition, the power transmission path may include a first power transmission path from the engine to the front wheels via the transfer, and a second power transmission path from the engine to the rear wheels via the transfer.

In a non-limiting embodiment, the transfer may include a transfer case holding a transfer oil for lubricating and cooling at least the transfer, and the motor may be held in the transfer case together with at least the transfer.

In a non-limiting embodiment, the pendulum damper may be held in the transfer case together with at least the transfer and the motor, and the pendulum damper may be lubricated by the transfer oil.

In a non-limiting embodiment, the motor may include at least a first motor and a second motor. The first motor may be arranged on the power transmission path closer to the drive wheel than the disconnecting clutch, and the second motor may be arranged on the power transmission path closer to the engine than the disconnecting clutch or closer to the drive wheel than the first motor.

In a non-limiting embodiment, number of oscillations of an oscillating member of the pendulum damper per revolution may be set in accordance with a first vibration order of the engine governed by a combustion cycle in the engine.

In a non-limiting embodiment, number of oscillations of an oscillating member of the pendulum damper per revolution may be set in accordance with a first vibration order of the motor governed by a number of poles of the motor.

In a non-limiting embodiment, number of oscillations of an oscillating member of the pendulum damper per revolution may be set in accordance with a natural vibration frequency of the power transmission path.

Thus, according to the embodiments of the present disclosure, the pendulum damper for suppressing torsional vibrations on the power transmission path, and the disconnecting clutch for selectively interrupting power transmission between the engine and the pendulum damper are disposed on the power transmission path. Specifically, the pendulum damper is arranged on the power transmission path closer to the drive wheels than the disconnecting clutch. In other words, the pendulum damper is arranged on an opposite side to the engine across the disconnecting clutch. According to the embodiments of the present disclosure, therefore, the engine may be disconnected from the power transmission path, and the inertial mass of the pendulum damper may be disconnected from a system including the engine, by disengaging the disconnecting clutch. Consequently, a natural vibration frequency of the system including the engine is raised. That is, reduction in the natural vibration frequency of the system including the engine to an idling speed of the engine can be prevented. For this reason, occurrence of resonance in the system including the engine can be prevented when operating the engine at around the idling speed, or when starting or stopping the engine.

In addition, according to the embodiments of the present disclosure, the pendulum damper is arranged downstream of the disconnecting clutch, in other words, between the disconnecting clutch and the drive wheel. According to the embodiments of the present disclosure, therefore, torsional vibrations on the power transmission path may be damped even if the engine is disconnected from the power transmission path by disengaging the disconnecting clutch. For example, torsional vibrations generated by factors other than engine such as torque ripple and cogging torque of a permanent magnet type synchronous motor may be suppressed by the pendulum damper. Thus, according to the embodiments of the present disclosure, it is possible to reduce noises and vibrations on the power transmission path by avoiding occurrence of resonance at around the idling speed of the engine. For this reason, N.V. performance of the vehicle can be improved.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Preferred embodiments of the present disclosure will now be explained with reference to the accompanying drawings.

The present disclosure is applied to a hybrid vehicle having an engine and at least one motor. In the hybrid vehicle, the motor is disposed on an output side of the engine to deliver torque to drive wheels via a transmission. The hybrid vehicle is provided with a disconnecting clutch that selectively disconnects the engine from a power transmission path between the engine and drive wheels, and a pendulum damper that damps torsional vibrations on the power transmission path.

Figure 1:
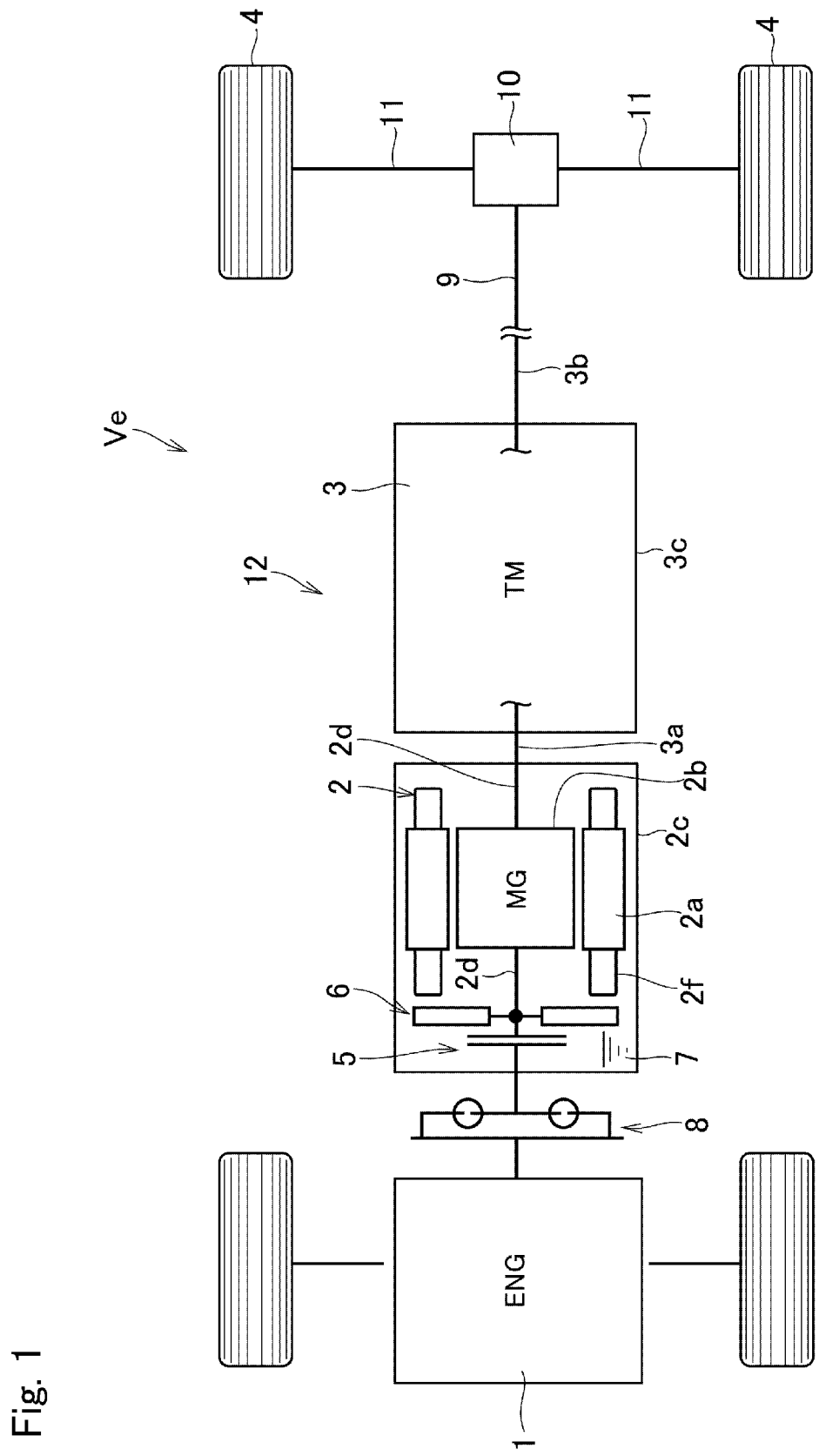
FIG. 1 is a schematic illustration showing a first embodiment of the hybrid vehicle according to the present disclosure.

Referring now to FIG. 1, there is schematically shown a first embodiment of a powertrain of a hybrid vehicle (as will be simply called the "vehicle" hereinafter) Ve. The vehicle Ve comprises an engine (referred to as "ENG" in FIG. 1) 1, a motor (referred to as "MG" in FIG. 1) 2, a transmission (referred to as "TM" in FIG. 1) 3, drive wheels 4, a disconnecting clutch 5, and the pendulum damper 6.

For example, an internal combustion engine such as a gasoline engine and a diesel engine may be adopted as the engine 1. An output power of the engine 1 may be adjusted electrically, and the engine 1 may be started and stopped electrically according to need. For example, given that the gasoline engine is used as the engine 1, an opening degree of a throttle valve, an amount of fuel supply, a commencement and a termination of ignition, an ignition timing etc. may be controlled electrically. Otherwise, given that the diesel engine is used as the engine 1, an amount of fuel injection, an ignition timing, an opening degree of a throttle valve of an EGR system etc. may be controlled electrically.

The motor 2 as a motor-generator is disposed on the output side of the engine 1. The motor 2 is driven as a motor to generate torque by supplying electricity thereto from a battery (not shown), and rotated as a generator by an output torque of the engine 1 to generate electricity. For example, a permanent magnet type synchronous motor, and an induction motor may be adopted as the motor 2.

In the motor 2, a stator 2a and a rotor 2b are housed in a motor case 2c, and motor oil 7 is encapsulated in the motor case 2c. Specifically, a bearing (not shown) supporting the rotor 2b and a coil end 2f are cooled and lubricated by the motor oil 7.

The motor 2 is connected to the engine 1 in a power transmittable manner so that a cranking of the engine 1 may be performed by an output torque of the motor 2. In order to start the engine 1 when a temperature of the engine 1 is low, or after parking the vehicle Ve for a long time, the engine 1 is provided with a starter motor (not shown). For example, the starter motor may be connected to the engine 1 through a speed reducing device (not shown) as a planetary gear unit comprising pinion gears and a ring gear.

In order to absorb torsional vibrations resulting from pulsation of an output torque of the engine 1, according to the first embodiment shown in FIG. 1, a spring damper 8 is disposed between the engine 1 and the motor 2. For example, a conventional torsional damper installed in a flywheel may be adapted as the spring damper 8.

The transmission 3 is disposed on a power transmission path 12 between the prime mover including the engine 1 and the motor 2 and the drive wheels 4 to transmit torque of the prime mover to the drive wheels 4. For example, an automatic transmission such as a geared transmission and a continuously variable transmission, or a manual transmission may be used as the transmission 3. The transmission 3 is adapted to change a ratio of a speed of an input shaft 3a to a speed of an output shaft 3b arbitrarily. Preferably, the transmission 3 is provided with a clutch that is engaged to transmit torque, and that is disengaged to interrupt torque transmission thereby establishing a neutral stage.

The prime mover is connected to the drive wheels 4 through the transmission 3, a propeller shaft 9, a differential gear unit 10, and driveshafts 11 so that the output torque(s) of the prime mover is delivered to the drive wheels 4. Thus, according to the first embodiment shown in FIG. 1, the power transmission path 12 includes the engine 1, the motor 2, the transmission 3, the propeller shaft 9, the differential gear unit 10, the driveshafts 11, and the drive wheels 4.

Thus, the vehicle Ve shown in FIG. 1 is a rear-drive layout vehicle in which a drive torque generated by the prime mover is delivered to a pair of rear wheels as drive wheels 4. Nonetheless, the present disclosure may also be applied to a front-drive layout vehicle in which the drive torque is delivered to a pair of front wheels, and a four-wheel-drive vehicle in which the drive torque is distributed to each pair of front wheels and rear wheels.

The disconnecting clutch 5 selectively disconnects the engine 1 from the power transmission path 12. Specifically, the disconnecting clutch 5 is disposed on the power transmission path 12 to selectively interrupt a power transmission between the engine 1 and the pendulum damper 6. For example, the disconnecting clutch 5 is disengaged to interrupt a power transmission between the engine 1 and the pendulum damper 6 in cases of: (1) starting the engine 1; (2) stopping the engine 1; and (3) operating the engine 1 at a speed around an idling speed.

For example, a friction clutch that can be engaged while causing a slip may be adapted as the disconnecting clutch 5.

According to the first embodiment shown in FIG. 1, a spring damper 8 is disposed downstream of the engine 1, and the disconnecting clutch 5 is disposed between the spring damper 8 and the motor 2. More specifically, a wet-type multiple-plate friction clutch is used as the disconnecting clutch 5, and the disconnecting clutch 5 is disposed in a motor case 2c between the spring damper 8 and the pendulum damper 6 disposed upstream of the motor 2.

When the disconnecting clutch 5 is in engagement, the engine 1 is connected to the power transmission path 12. In this case, the vehicle Ve may be propelled in an engine mode by transmitting an output torque of the engine 1 to the drive wheels 4, or in a hybrid mode by transmitting output torques of the engine 1 and the motor 2 to the drive wheels 4.

By contrast, when the disconnecting clutch 5 is in disengagement, the engine 1 is disconnected from the power transmission path 12. In this case, the vehicle Ve may be propelled in an electric vehicle mode by transmitting an output torque of the motor 2 to the drive wheels 4. In the electric vehicle mode, since the engine 1 is disconnected from the power transmission path 12, a drag loss of the engine 1 can be reduced thereby improving an energy efficiency.

As described, the disconnecting clutch 5 is disposed upstream of the pendulum damper 6 on the power transmission path 12. In other words, the disconnecting clutch 5 is disposed between the engine 1 and the pendulum damper 6. That is, when disengaging the disconnecting clutch 5, a power transmission between the engine 1 and the pendulum damper 6 is interrupted, and an inertial mass of the pendulum damper 6 is separated from a vibration system of the engine 1. For this reason, it is possible to prevent a reduction in a natural vibration frequency of the system including the engine 1 as might be caused by adding the inertial mass of the pendulum damper 6 to the system including the engine 1. In addition, the disconnecting clutch 5 may also be used as a fail-safe. For example, when the engine 1 is in trouble, the pendulum damper 6 disposed downstream of the disconnecting clutch 5 can be protected by disengaging the disconnecting clutch 5. Specifically, when a speed of the engine 1 is raised excessively, the pendulum damper 6 can be prevented from being rotated excessively by disengaging the disconnecting clutch 5. For this reason, damage on the pendulum damper 6 can be limited.

The pendulum damper 6 is adapted to absorb torsional vibrations on the power transmission path 12. For example, the torsional vibration damper described in US 2012/0055283 A, centrifugal pendulum dampers described in Japanese patent No. 5862767 and German Patent Publication No. 102014202138 may be adopted as the pendulum damper 6. In any of those conventional dampers described in the above-listed prior art documents, an oscillating member itself serves as an inertial mass for establishing a vibration damping torque. According the embodiments of the present disclosure, however, other kinds of dampers may also be adopted as the pendulum damper 6. For example, a pendulum damper in which a torque is applied to an inertial member through an oscillating member may also be adopted as the pendulum damper 6. The applicant of the present disclosure has proposed this kind of pendulum dampers in Japanese Patent Application Nos. 2016-26845 and 2017-153909. In addition, a torque pulse suppressing device described in JP-A-2017-40318 may be categorized as this kind of pendulum damper. That is, the pendulum damper 6 is a dynamic damper that absorbs torsional vibrations on the power transmission path 12 resulting from torque pulse by an inertial force derived from an oscillating motion of a rolling member or a damper mass.

The pendulum damper 6 is disposed downstream of the disconnecting clutch 5 on the power transmission path 12. In other words, the pendulum damper 6 is disposed on the power transmission path 12 between the disconnecting clutch 5 and the drive wheels 4. According to the first embodiment shown in FIG. 1, the pendulum damper 6 is disposed in the motor case 2c between the disconnecting clutch 5 and the motor 2 while being connected to a rotor shaft 2d of the motor 2. Since the pendulum damper 6 is held in the motor case 2c, a dust cover for protecting pendulum damper 6 from dust and moisture the may be omitted.

As described, the motor oil 7 is encapsulated in the motor case 2c to lubricate the motor 2. According to the embodiments of the present disclosure, not only a dry-type damper that is not necessary to be lubricated but also a wet-type damper that is necessary to be lubricated may be adopted as the pendulum damper 6. Given that the wet-type damper is used as the pendulum damper 6, the pendulum damper 6 may also be lubricated by the motor oil 7 held in the motor case 2c. That is, in the motor case 2c, not only the motor 2 but also the pendulum damper 6 can be lubricated by the motor oil 7. Thus, the pendulum damper 6 may be lubricated without requiring any specific lubrication device.

In addition, by thus using the wet-type damper as the pendulum damper 6, collision noise of the rolling member (or oscillating member) may be reduced by viscosity of the motor oil 7 when the pendulum damper 6 starts rotating or when the pendulum damper 6 stops. Otherwise, the dry-type damper may also be arranged in the motor case 2c to serve as the pendulum damper 6 by covering the dry-type damper by a cover for blocking the motor oil 7 (not shown).

In the pendulum damper 6, number of oscillations of the oscillating member per revolution to suppress vibrations is set in accordance with a first vibration order of the engine 1 governed by number of cylinders and a combustion cycle. Otherwise, given that a permanent magnet type synchronous motor is used as the motor 2, in the pendulum damper 6, the number of oscillations of the oscillating member per revolution may also be set in accordance with a frequency of torque ripple or cogging torque per revolution governed by number of poles and a pitch angle of the poles of the motor 2. Further, in the pendulum damper 6, the number of oscillations of the oscillating member per revolution may also be set in accordance with a natural vibration frequency of an entire vibration system of the power transmission path 12. According to the embodiments of the present disclosure, therefore, the torsional vibrations on the power transmission path 12 may be damped effectively by the pendulum damper 6. In the pendulum damper 6, the number of oscillations of the oscillating member per revolution may be adjusted according to an outer diameter or dimensions of the pendulum damper 6, or according to a mass of the oscillating member or damper mass.

As described, if the natural vibration frequency of the system including the engine 1 is reduced to the vibration frequency of the engine 1 at the idling speed, a resonance may occur in the system including the engine 1 when idling the engine 1, and when starting or stopping the engine 1. In order to avoid occurrence of such resonance, according to the first embodiment, the pendulum damper 6 is disposed closer to the drive wheels 4 than the disconnecting clutch 5. Therefore, the pendulum damper 6 can be disconnected from the system including the engine 1 by disengaging the disconnecting clutch 5 disposed between the system including the engine 1 and the pendulum damper 6. For this reason, it is possible to prevent a reduction in the natural vibration frequency of the system including the engine 1 as might be caused by adding the inertial mass of the pendulum damper 6 to the system including the engine 1.

Given that a high-power engine having a supercharger is employed as the engine 1, it is necessary to increase stiffness of the spring damper 8. However, if number of cylinders of the engine 1 is relatively small, e.g., three cylinders or four cylinders, a resonance point between the spring damper 8 and the engine 1 would be raised to around 1000 rpm by increasing the stiffness of the spring damper 8. Consequently, the natural vibration frequency of the system including the engine 1 would be reduced to the vibration frequency of the engine 1 at around the idling speed. However, according to the first embodiment, the natural vibration frequency of the system including the engine 1 may be raised to be higher than that at the idling speed by disengaging the disconnecting clutch 5 to disconnect the pendulum damper 6 from the system including the engine 1. According to the first embodiment, therefore, occurrence of resonance can be prevented when idling the engine 1, and when starting or stopping the engine 1. For this reason, N.V. performance of the vehicle Ve can be improved.

Next, here will be explained another embodiments of the present disclosure with reference to FIGS. 2 to 14. In FIGS. 2 to 14 common reference numeral are allotted to the elements in common with those of the first embodiment shown in FIG. 1.

Figure 2:
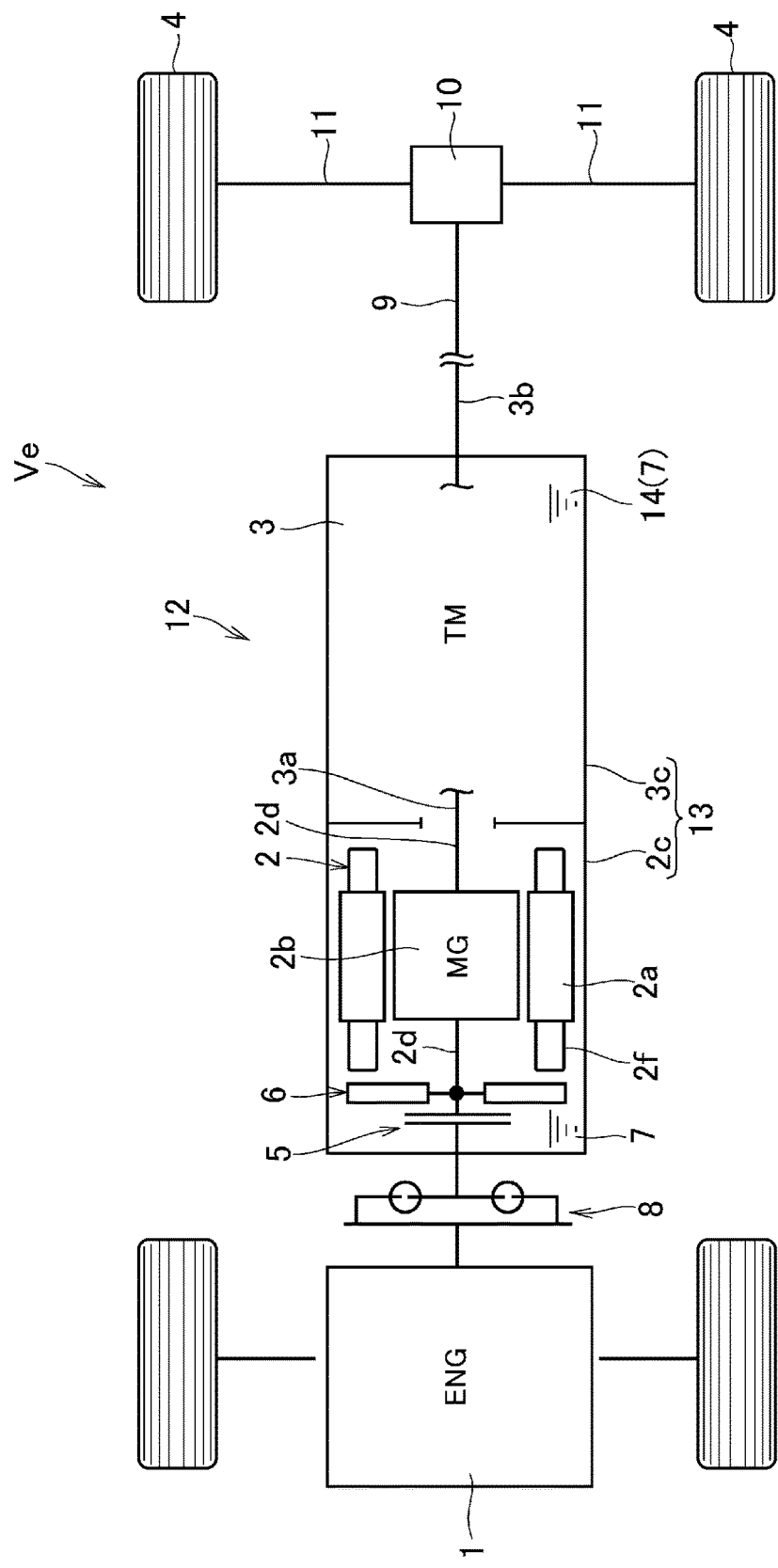
FIG. 2 is a schematic illustration showing a second embodiment of the hybrid vehicle according to the present disclosure.

Turning to FIG. 2, there is shown the second embodiment of the present disclosure. According to the second embodiment, the motor case 2c is joined to a transmission case 3c by e.g., a bolt to form a case 13, and the motor 2 and the transmission 3 are held in the case 13 while being connected to each other. Instead, both of the motor 2 and the transmission 3 may also be held in the motor case 2c or the transmission case 3c.

Oil 14 for lubricating and cooling at least one of the motor 2 and the transmission 3 is held in the case 13. The aforementioned motor oil 7 used in the first embodiment may also serve as the oil 14. The disconnecting clutch 5 and the pendulum damper 6 are also arranged in the case 13, and the pendulum damper 6 is connected to the rotor shaft 2d of the motor 2. According to the second embodiment, the pendulum damper 6 is arranged together with at least the motor 2, and lubricated by the oil 14.

Figure 3:
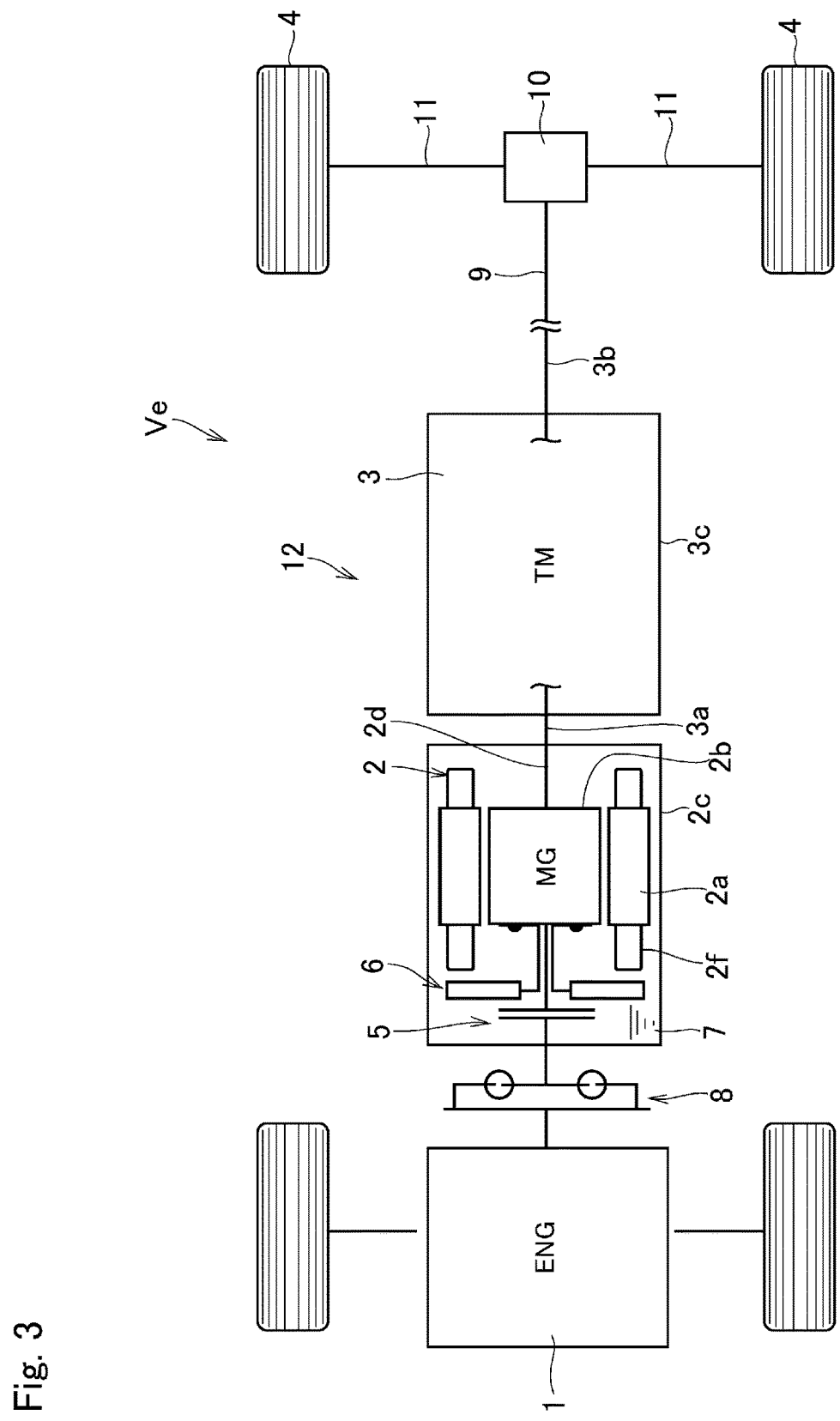
FIG. 3 is a schematic illustration showing a third embodiment of the hybrid vehicle according to the present disclosure.
Figure 4:
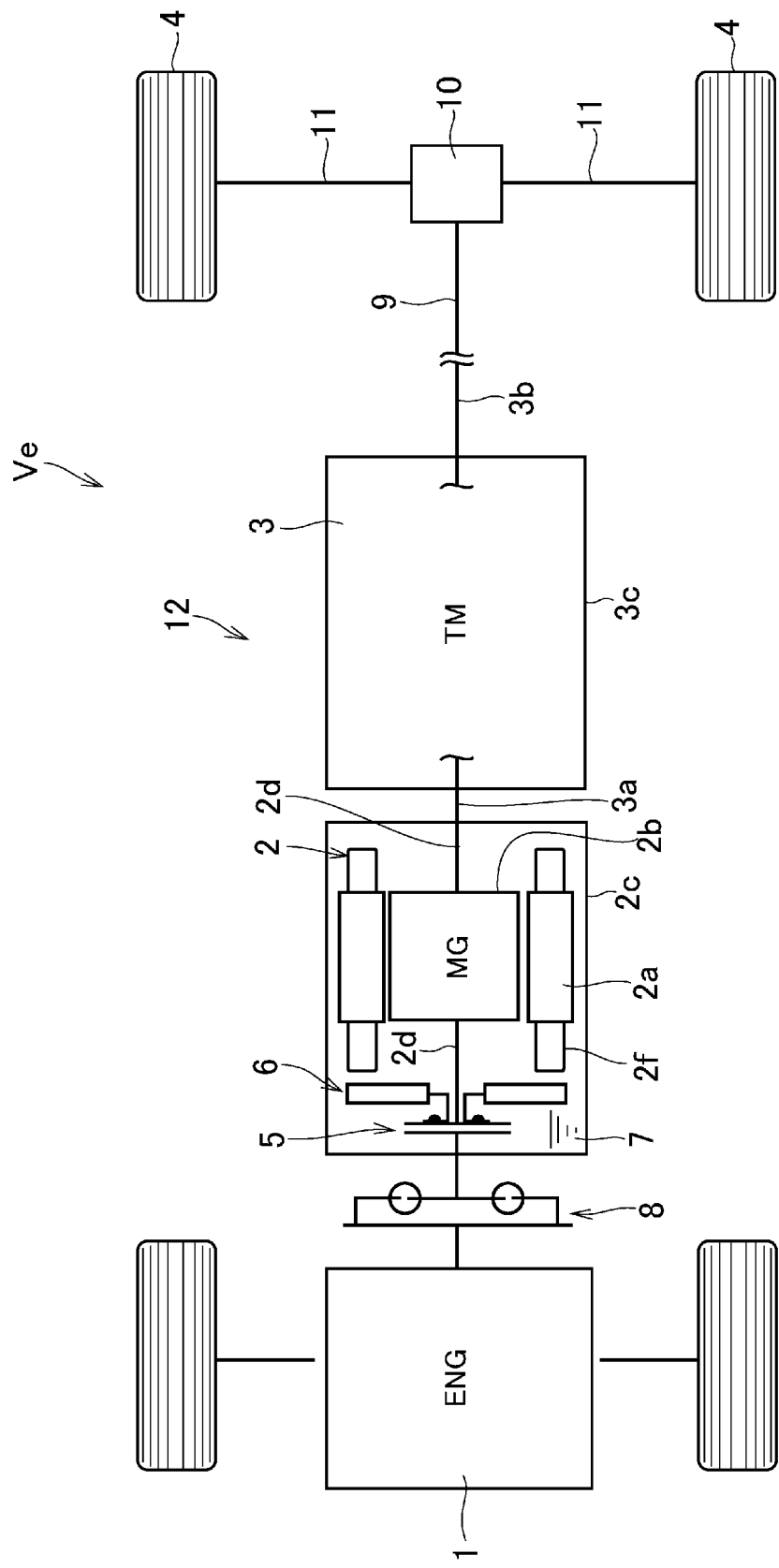
FIG. 4 is a schematic illustration showing a fourth embodiment of the hybrid vehicle according to the present disclosure.
Figure 5:
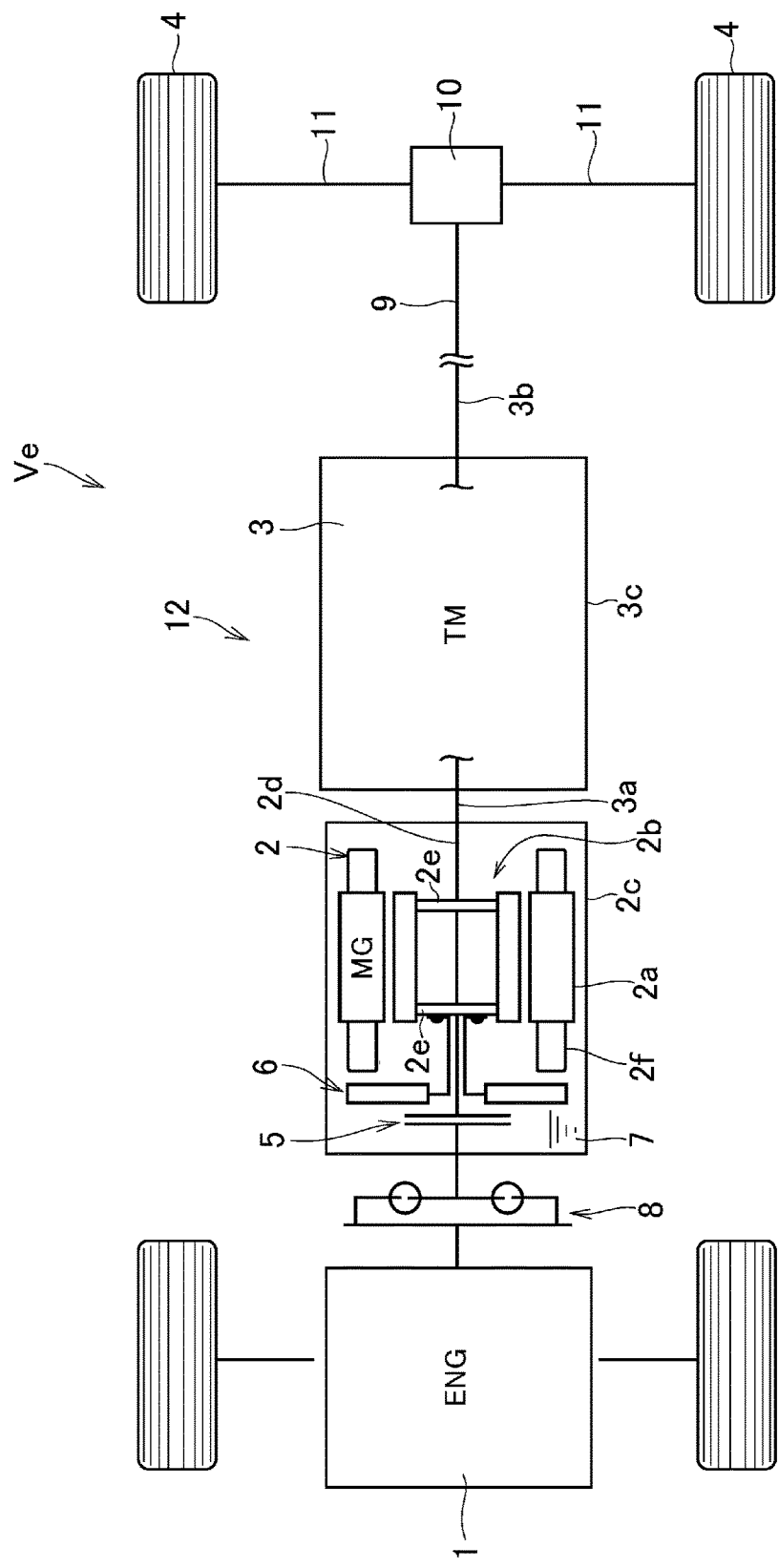
FIG. 5 is a schematic illustration showing a fifth embodiment of the hybrid vehicle according to the present disclosure.

According to the third embodiment shown in FIG. 3, the pendulum damper 6 is connected to the rotor 2b of the motor 2. According to the fourth embodiment shown in FIG. 4, the pendulum damper 6 is connected to an output side of the disconnecting clutch 5. According to the fifth and sixth embodiments shown in FIGS. 5 and 6, the pendulum damper 6 is connected to a rotor stay 2e of the motor 2. According to the seventh embodiment shown in FIG. 7, the pendulum damper 6 is connected to the rotor shaft 2d of the motor 2 as in the first and the second embodiments.

In any of the first and the third to seventh embodiments, the pendulum damper 6 is held in the motor case 2c on a front side of the motor 2, that is, an opening side of the motor case 2c. For this reason, the pendulum damper 6 may be fitted easily into the motor case 2c.

Figure 6:
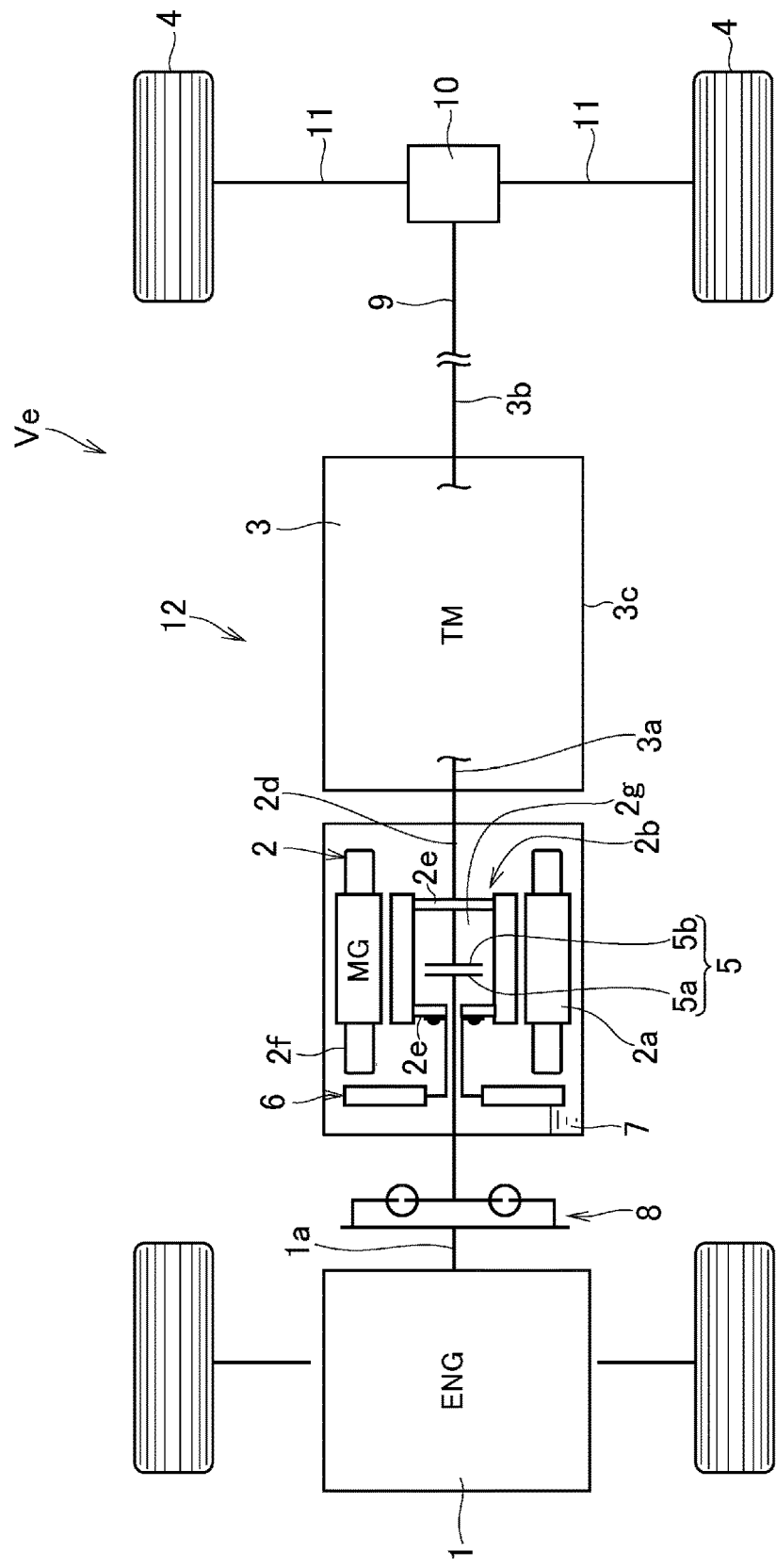
FIG. 6 is a schematic illustration showing a sixth embodiment of the hybrid vehicle according to the present disclosure.

According to the sixth embodiment shown in FIG. 6, the disconnecting clutch 5 is arranged in a hollow space 2g of the rotor 2b while being connected to the rotor shaft 2d. The disconnecting clutch 5 comprises an input member 5a connected to the output shaft 1a of the engine 1 through the spring damper 8, and an output member 5b connected to the rotor shaft 2d and the rotor 2b of the motor 2 in the hollow space 2g. Accordingly, the disconnecting clutch 5 is brought into engagement by engaging the input member 5a and the output member 5b with each other. Thus, according to the sixth embodiment, the engine 1, the spring damper 8, the disconnecting clutch 5, the pendulum damper 6, the motor 2, and the transmission 3 are arranged in order on the power transmission path 12. By thus arranging the disconnecting clutch 5 in the hollow space 2g of the rotor 2b, an axial length of the power transmission path 12 may be reduced.

Figure 7:
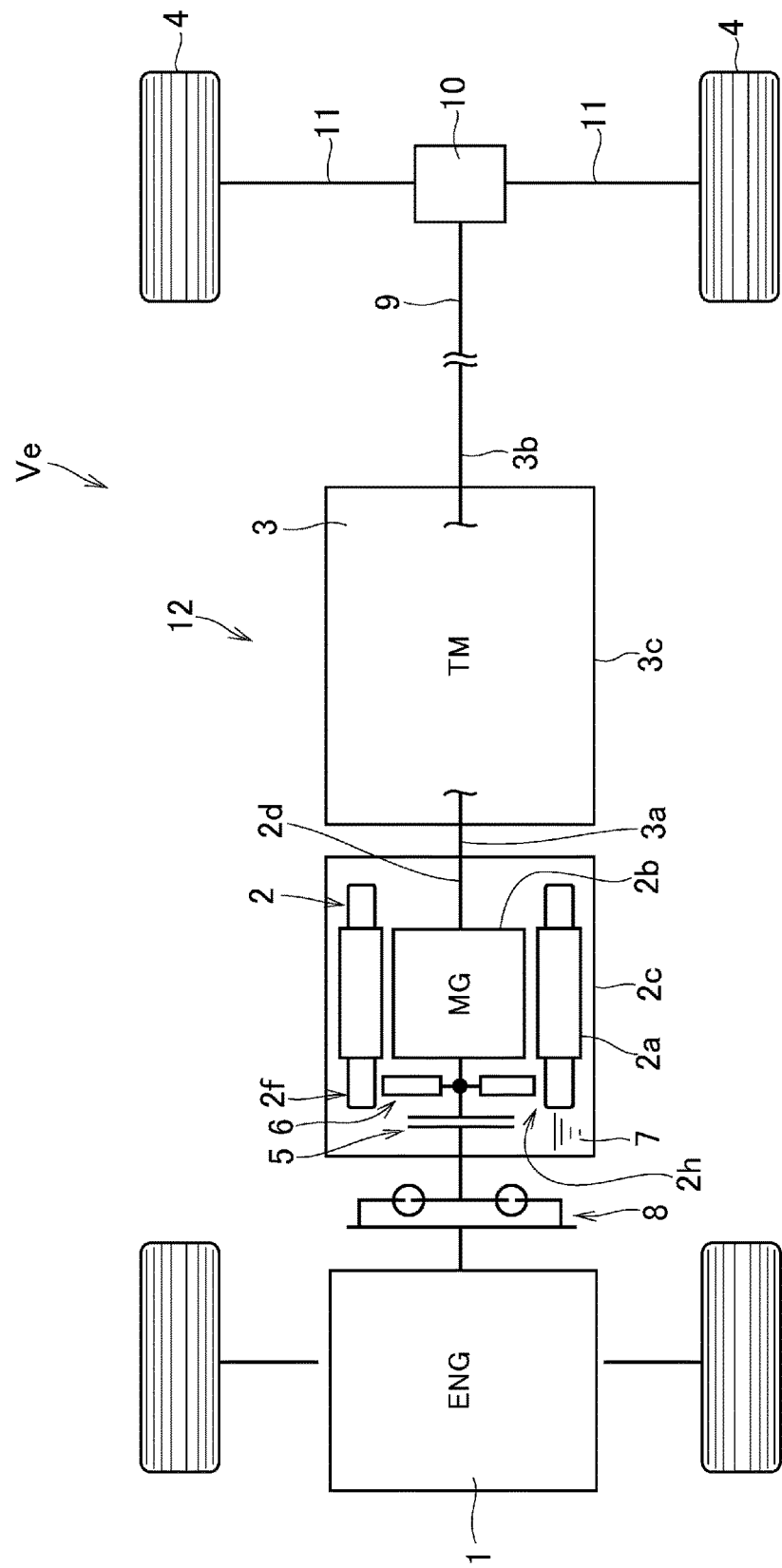
FIG. 7 is a schematic illustration showing a seventh embodiment of the hybrid vehicle according to the present disclosure.

According to the seventh embodiment shown in FIG. 7, the pendulum damper 6 is arranged in an inner circumferential space 2h of the coil end 2f of the motor 2. Specifically, the coil end 2f is a portion of a coil wound around a core (not shown) of the stator 2a protruding in an axial direction respectively from each axial end of the stator 2a, and the pendulum damper 6 is held in the inner circumferential space 2h of the coil end 2f protruding toward the front side of the vehicle Ve. According to the seventh embodiment shown in FIG. 7, therefore, the axial length of the power transmission path 12 may also be reduced.

According to the seventh embodiment shown in FIG. 7, the pendulum damper 6 is also connected to the rotor shaft 2d of the motor 2 as the first and the second embodiments.

Figure 8:
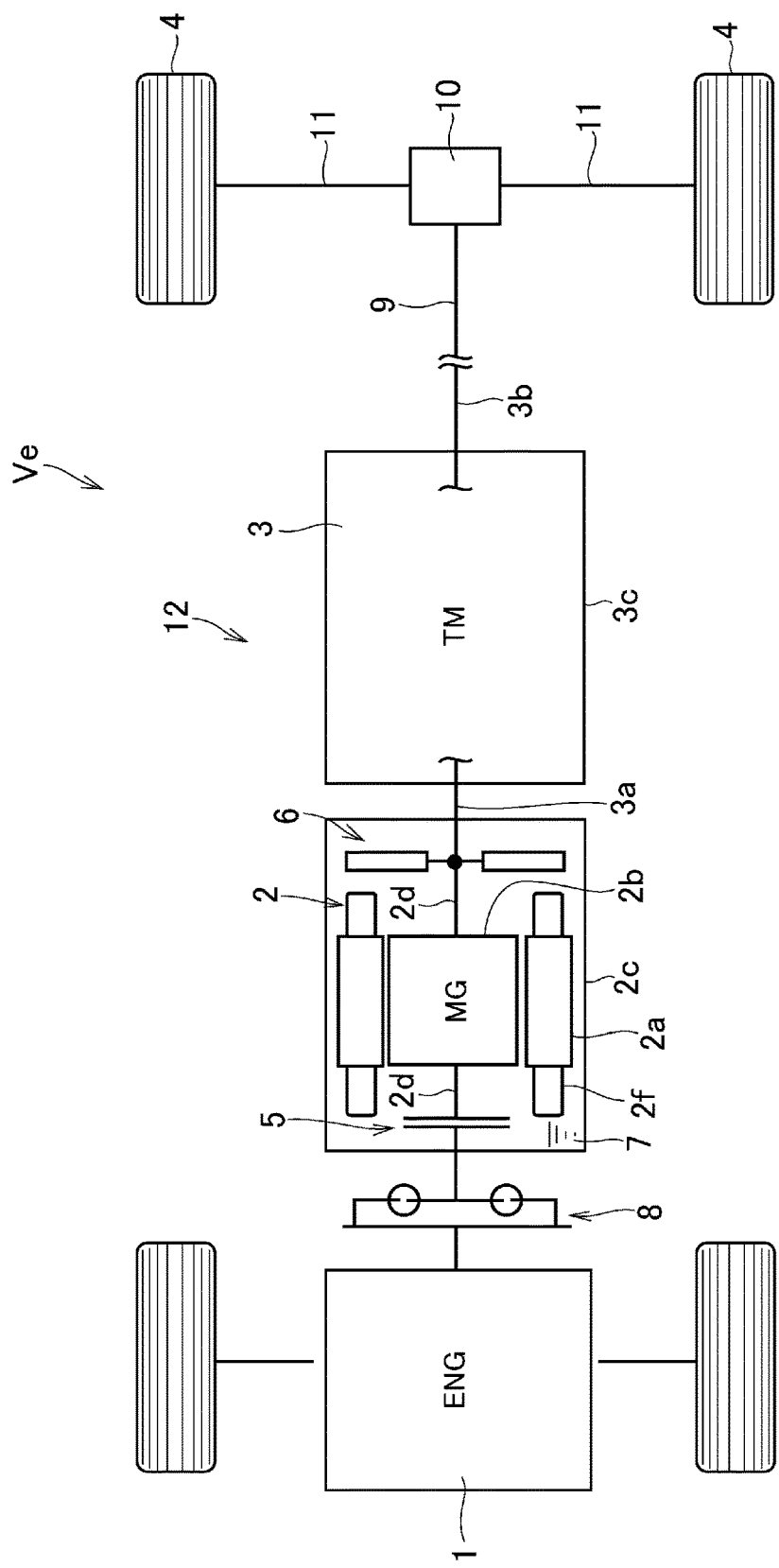
FIG. 8 is a schematic illustration showing an eighth embodiment of the hybrid vehicle according to the present disclosure.

Turning to FIG. 8, there is shown the eighth embodiment of the present disclosure. According to the eighth embodiment, the pendulum damper 6 is arranged in the motor case 2c on the rear side of the motor 2 while being connected to the rotor shaft 2d of the motor 2. The rotor shaft 2d is connected to the input shaft 3a of the transmission 3.

In general, electric wires of the motor 2 and oil pipes for circulating the motor oil 7 are concentrated to the front section of the motor case 2c, and hence an available space in the rear section of the motor case 2c is relatively large. In the eighth embodiment, the pendulum damper 6 is arranged in the available space of the rear section of the motor case 2c. According to the eighth embodiment shown in FIG. 8, therefore, the axial length of the power transmission path 12 may also be reduced.

Figure 9:
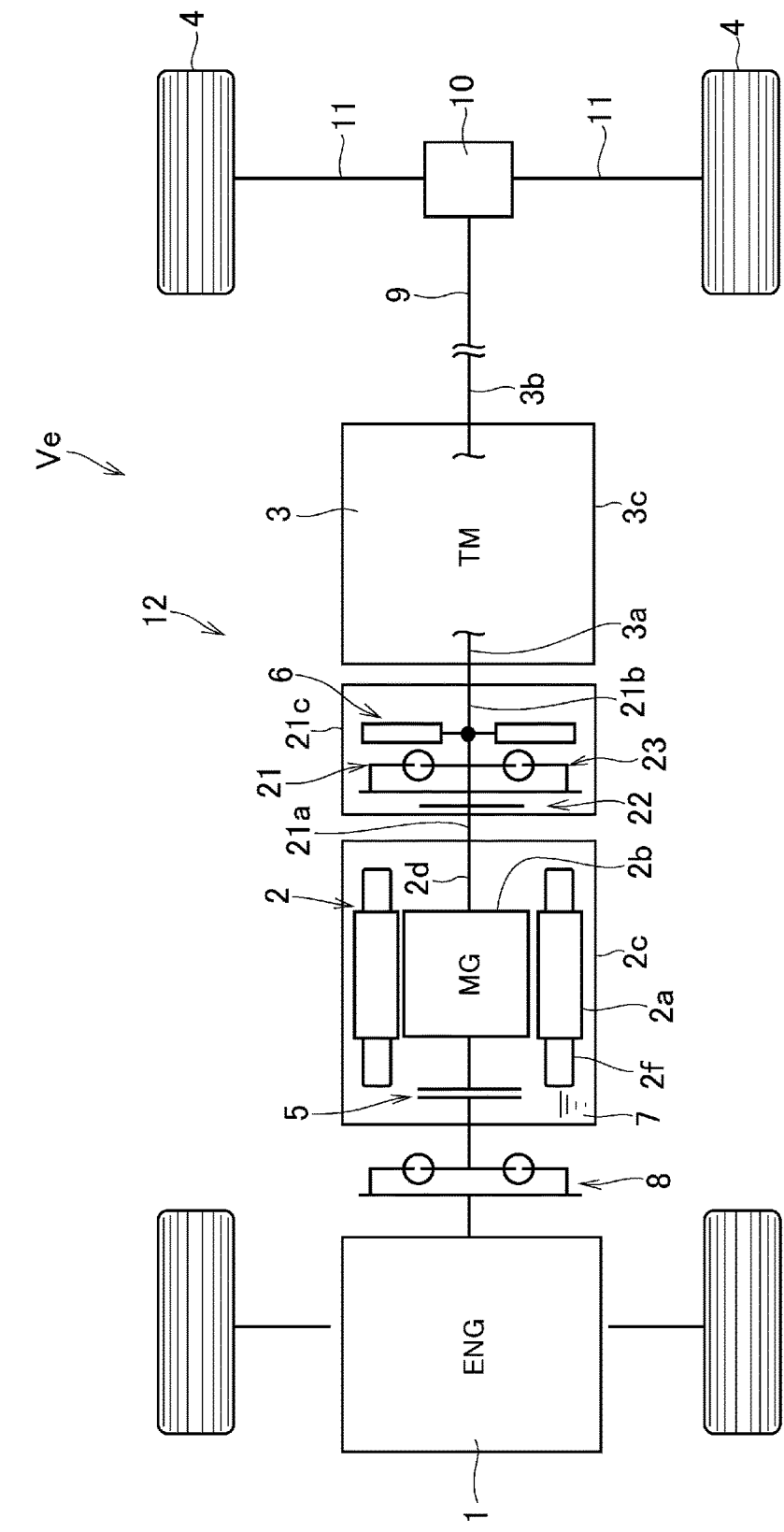
FIG. 9 is a schematic illustration showing a ninth embodiment of the hybrid vehicle according to the present disclosure.

Turning to FIG. 9, there is shown the ninth embodiment of the present disclosure. According to the ninth embodiment, a torque converter 21 is arranged on the power transmission path 12 between the output side of the motor 2 and the transmission 3. Specifically, an input shaft 21a of the torque converter 21 is connected to the rotor shaft 2d of the motor 2, and an output shaft 21b of the torque converter 21 is connected to the input shaft 3a of the transmission 3. The torque converter 21 comprises a lockup clutch 22 and a spring damper 23, and the lockup clutch 22 and the spring damper 23 are held in a case 21c of the torque converter 21. Thus, according to the ninth embodiment, the vehicle Ve is provided with the spring damper 8 arranged on the output side of the engine 1 and the spring damper 23 arranged in the case 21c of the torque converter 21.

According to the ninth embodiment, the disconnecting clutch 5 is arranged in the motor case 2c on the front side of the motor 2. Thus, according to the embodiments of the present disclosure, the disconnecting clutch 5 is disposed on the power transmission path 12 between the engine 1 and the motor 2.

According to the ninth embodiment, the pendulum damper 6 is arranged in the case 21c of the torque converter 21 while being connected to the output shaft 21b of the torque converter 21. Thus, the pendulum damper 6 is disposed on the power transmission path 12 between the torque converter 21 and the transmission 3.

Given that the wet-type damper is used as the pendulum damper 6, the pendulum damper 6 may be lubricated by an automatic transmission fluid (not shown) held in the case 21c of the torque converter 21. Thus, the pendulum damper 6 may be lubricated without requiring any specific lubrication device.

Thus, according to the ninth embodiment, two spring dampers 8 and 23 are arranged upstream of the pendulum damper 6. According to the ninth embodiment, therefore, stiffness of each of the spring dampers 8 and 23 may be reduced respectively so that the vibration damping performance of the pendulum damper 6 is enhanced.

Figure 10:
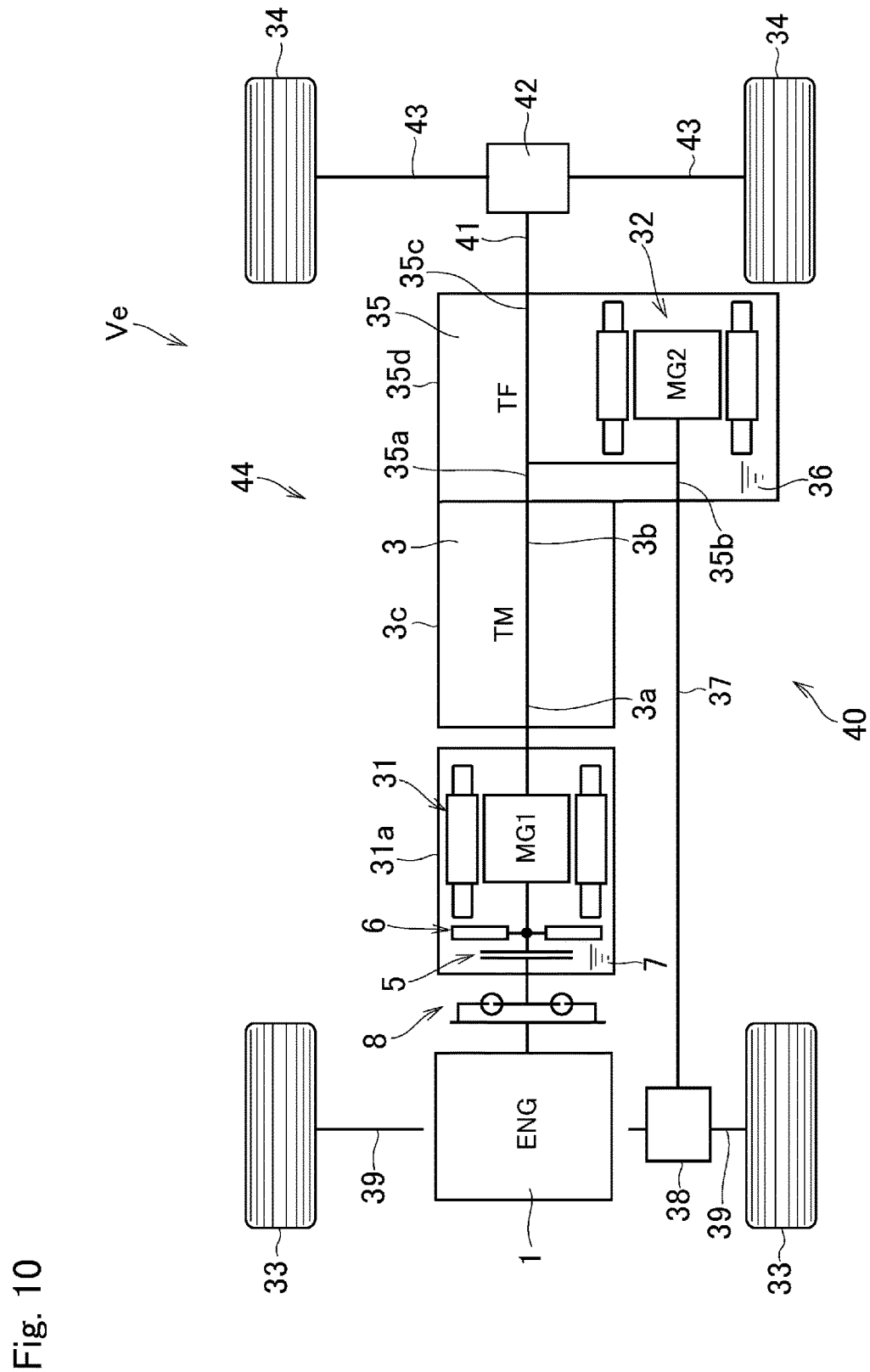
FIG. 10 is a schematic illustration showing a tenth embodiment of the hybrid vehicle according to the present disclosure.

The present disclosure may also be applied to a four-wheel-drive vehicles as shown in FIGS. 10 to 14. Turning to FIG. 10, there is shown the tenth embodiment of the present disclosure. According to the tenth embodiment, a prime mover of the vehicle Ve includes the engine 1, a first motor (referred to as "MG1" in FIG. 10) 31, and a second motor (referred to as "MG2" in FIG. 10) 32. The vehicle Ve according to the tenth embodiment comprises the transmission 3, a pair of front wheels 33, a pair of rear wheels 34, and a transfer (referred to as "TF" in FIG. 10) 35.

The first motor 31 as a motor-generator is also disposed on the output side of the engine 1. As described, a permanent magnet type synchronous motor, and an induction motor may be adopted as the first motor 31. According to the tenth embodiment, the disconnecting clutch 5 and the pendulum damper 6 are arranged in a motor case 31a of the first motor 31.

The second motor 32 is also a motor-generator, and installed in the transfer 35. For example, a permanent magnet type synchronous motor, and an induction motor may also be adopted as the second motor 32.

In the vehicle Ve according to the tenth embodiment, a drive torque generated by the prime mover including the engine 1, the first motor 31, and the second motor 32 is delivered to both pairs of the front wheels 33 and the rear wheels 34 to establish a drive force to propel the vehicle Ve.

The transfer 35 is a transmission mechanism adapted to switch a drive mode between two-wheel drive mode in which the drive torque is delivered to any one of the pairs of the front wheels 33 and the rear wheels 34, and four-wheel drive mode in which the drive torque is delivered to both pairs of the front wheels 33 and the rear wheels 34. The drive mode may be fixed to the four-wheel drive mode by the transfer 35 according to need. For example, a differential gear mechanism and a chain-drive mechanism may be adopted as the transfer 35.

The transfer 35 comprises an input shaft 35a connected to the output shaft 3b of the transmission 3, a front output shaft 35b connected to an after-mentioned front propeller shaft 37, a rear output shaft 35c connected to an after-mentioned rear propeller shaft 41, and a transfer case 35d holding the transfer 35 and the second motor 32. Transfer oil 36 for lubricating and cooling at least the transfer 35 and the second motor 32 is also held in the transfer case 35d. The second motor 32 is connected to the front output shaft 35b. The input shaft 35a and the rear output shaft 35c are connected to each other in a power transmittable manner, and the front output shaft 35b is interlinked with the input shaft 35a and the rear output shaft 35c through a geared transmission mechanism or a chain drive mechanism (neither of which are shown). Thus, an output torque of the second motor 32 is delivered to at least one of the pairs of the front wheels 33 and the rear wheels 34 through the transfer 35.

According to the tenth embodiment, each of the front wheels 33 is connected individually to the engine 1 and the first motor 31 through the transmission 3, the transfer 35, the front propeller shaft 37, a front differential gear unit 38, and a front driveshaft 39. Each of the front wheels 33 is also connected individually to the second motor 32 through the front propeller shaft 37, the front differential gear unit 38, and the front driveshaft 39. In the vehicle Ve shown in FIG. 10, accordingly, a first power transmission path 40 is formed between the engine 1 and the pair of front wheels 33 thorough the first motor 31, the transfer 35, the front propeller shaft 37, the front differential gear unit 38, and the front driveshaft 39.

On the other hand, each of the rear wheels 34 is connected individually to the engine 1 and the first motor 31 through the transmission 3, the transfer 35, a rear propeller shaft 41, a rear differential gear unit 42, and a rear driveshaft 43. Each of the rear wheels 34 is also connected individually to the second motor 32 through the transfer 35, the rear propeller shaft 41, the rear differential gear unit 42, and the rear driveshaft 43. In the vehicle Ve shown in FIG. 10, accordingly, a second power transmission path 44 is formed between the engine 1 and the pair of rear wheels 34 thorough the first motor 31, the transfer 35, the rear propeller shaft 41, the rear differential gear unit 42, and the rear driveshaft 43.

Thus, in the vehicle Ve as a four-wheel drive having the transfer 35, the first power transmission path 40 is formed between the engine 1 and the pair of front wheels 33, and the second power transmission path 44 is formed between the engine 1 and the pair of rear wheels 34.

In addition, in the vehicle Ve as a four-wheel drive having the transfer 35, the first motor 31 is disposed on the power transmission path closer to the drive wheels than the disconnecting clutch 5, and the second motor 32 is disposed on the power transmission path closer to the drive wheels than the first motor 31.

Specifically, in the first power transmission path 40, the first motor 31 is situated closer to the front wheels 33 than the disconnecting clutch 5, and in the second power transmission path 44, the first motor 31 is situated closer to the rear wheels 34 than the disconnecting clutch 5. On the other hand, in the first power transmission path 40, the second motor 32 is situated closer to the front wheels 33 than the first motor 31, and in the second power transmission path 44, the second motor 32 is situated closer to the rear wheels 34 than the first motor 31.

That is, in the first power transmission path 40, the disconnecting clutch 5 is disposed between the engine 1 and the first motor 31, and in the second power transmission path 44, the disconnecting clutch 5 is disposed between the engine 1 and the second motor 32. In the vehicle Ve shown in FIG. 10, therefore, the engine 1 can be disconnected from each of the first power transmission path 40 and the second power transmission path 44 by disengaging the disconnecting clutch 5. For this reason, a drag loss as might be caused by rotating the engine 1 passively can be prevented by disengaging the disconnecting clutch 5 during propulsion in the electric vehicle mode in which the vehicle Ve is powered by the first motor 31 and the second motor 32. In other words, energy efficiency in the electric vehicle mode can be improved.

Figure 11:
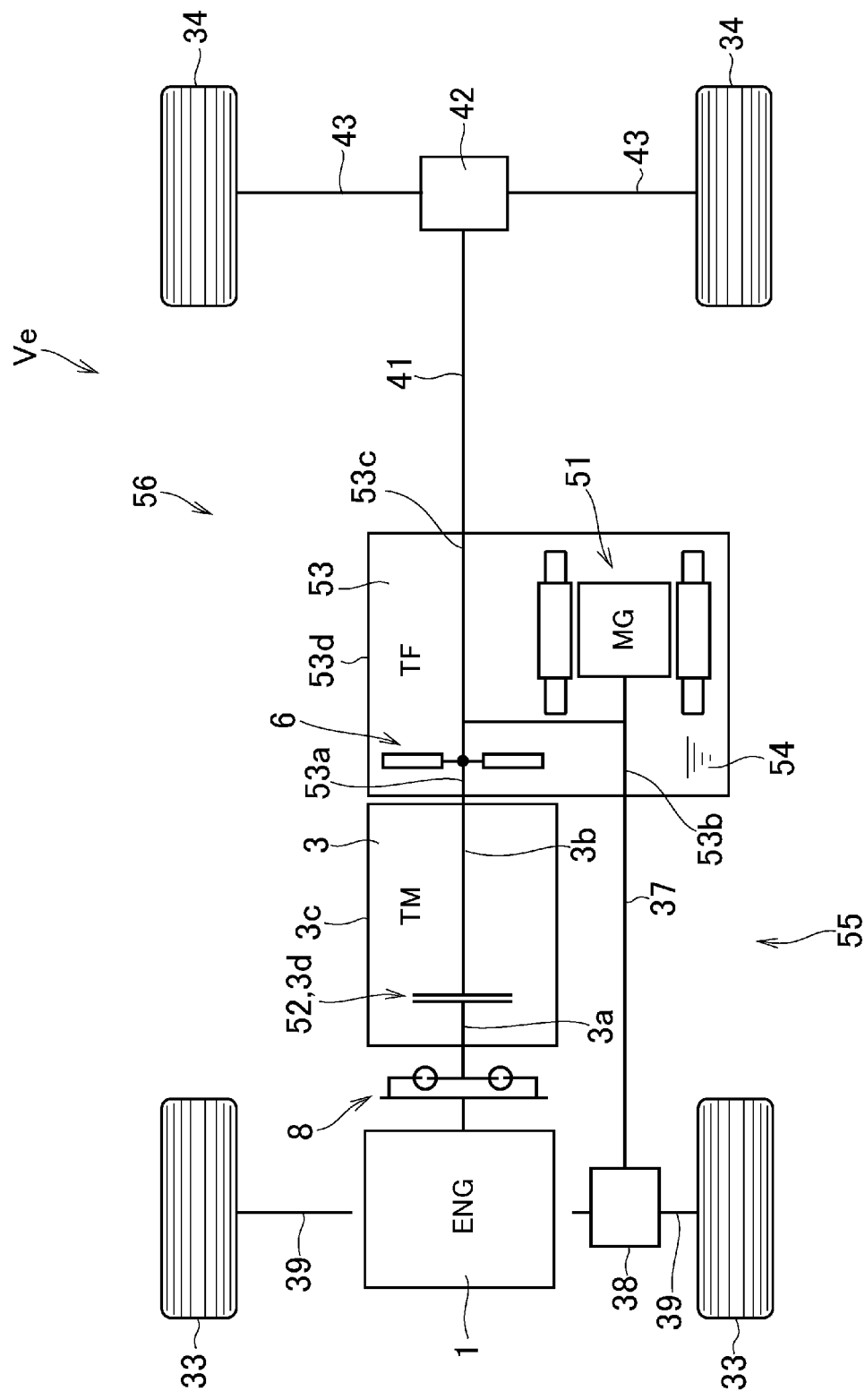
FIG. 11 is a schematic illustration showing an eleventh embodiment of the hybrid vehicle according to the present disclosure.

Turning to FIG. 11, there is shown the eleventh embodiment of the present disclosure. According to the eleventh embodiment, the prime mover includes the engine 1 and a motor (referred to as "MG" in FIG. 11) 51. The vehicle Ve shown in FIG. 11 comprises the transmission 3, a disconnecting clutch 52, the pendulum damper 6, the front wheels 33, the rear wheels 34, and a transfer (referred to as "TF" in FIG. 11) 53.

The motor 51 as a motor-generator is disposed on the output side of the engine 1. For example, a permanent magnet type synchronous motor, and an induction motor may be adopted as the motor 51. As explained later, the motor 51 is installed in the transfer 53.

A clutch 3d of the transmission 3 serves as the disconnecting clutch 52. When the clutch 3d is engaged, the transmission 3 is allowed to transmit torque therethrough with a predetermined speed ratio or in a predetermined gear stage. By contrast, when the clutch 3d is disengaged, the transmission 3 is brought into a neutral stage so that torque transmission through the transmission 3 is interrupted. By thus using the clutch 3d of the transmission 3 as the disconnecting clutch 52, number of parts can be reduced. For this reason, the vehicle Ve may be downsized and a weight of the vehicle Ve may be reduced. In addition, a manufacturing cost of the vehicle Ve may be reduced.

For example, a differential gear mechanism and a chain-drive mechanism may also be adopted as the transfer 53. The transfer 53 comprises an input shaft 53a connected to the output shaft 3b of the transmission 3, a front output shaft 53b connected to the front propeller shaft 37, a rear output shaft 53c connected to the rear propeller shaft 41, and a transfer case 53d holding the transfer 35 and the motor 51. Transfer oil 54 for lubricating and cooling at least the transfer 53, the motor 51, and the pendulum damper 6 is also held in the transfer case 53d. The motor 51 is connected to the front output shaft 53b. The input shaft 53a and the rear output shaft 53c are connected to each other in a power transmittable manner, and the front output shaft 53b is interlinked with the input shaft 53a and the rear output shaft 53c through a geared transmission mechanism or a chain drive mechanism (neither of which are shown). Thus, an output torque of the motor 51 is delivered to at least one of the pairs of the front wheels 33 and the rear wheels 34 through the transfer 53.

The pendulum damper 6 is also held in the transfer 53 together with the motor 51. Specifically, the pendulum damper 6 is arranged in a front section of the transfer case 53d while being connected to the input shaft 53a of the transfer 53.

According to the eleventh embodiment, each of the front wheels 33 is connected individually to the engine 1 and the motor 51 through the transmission 3, the transfer 53, the front propeller shaft 37, the front differential gear unit 38, and the front driveshaft 39. In the vehicle Ve shown in FIG. 11, accordingly, a first power transmission path 55 is formed between the engine 1 and the pair of front wheels 33 thorough the motor 51, the transfer 53, the front propeller shaft 37, the front differential gear unit 38, and the front driveshaft 39.

On the other hand, each of the rear wheels 34 is connected individually to the engine 1 and the motor 51 through the transmission 3, the transfer 53, the rear propeller shaft 41, the rear differential gear unit 42, and the rear driveshaft 43. In the vehicle Ve shown in FIG. 11, accordingly, a second power transmission path 56 is formed between the engine 1 and the pair of rear wheels 34 thorough the motor 51, the transfer 53, the rear propeller shaft 41, the rear differential gear unit 42, and the rear driveshaft 43.

Thus, in the vehicle Ve as a four-wheel drive vehicle having the transfer 53, the first power transmission path 55 is formed between the engine 1 and the pair of front wheels 33, and the second power transmission path 56 is formed between the engine 1 and the pair of rear wheels 34.

According to the eleventh embodiment, the disconnecting clutch 52 is situated between the engine 1 and the motor 51 not only in the first power transmission path 55 but also in the second power transmission path 56. In the vehicle Ve shown in FIG. 11, therefore, the engine 1 can be disconnected from each of the first power transmission path 55 and the second power transmission path 56 by disengaging the disconnecting clutch 52. For this reason, a drag loss as might be caused by rotating the engine 1 passively can be prevented by disengaging the disconnecting clutch 52 during propulsion in the electric vehicle mode in which the vehicle Ve is powered by the motor 51. In other words, energy efficiency in the electric vehicle mode can be improved.

Figure 12:
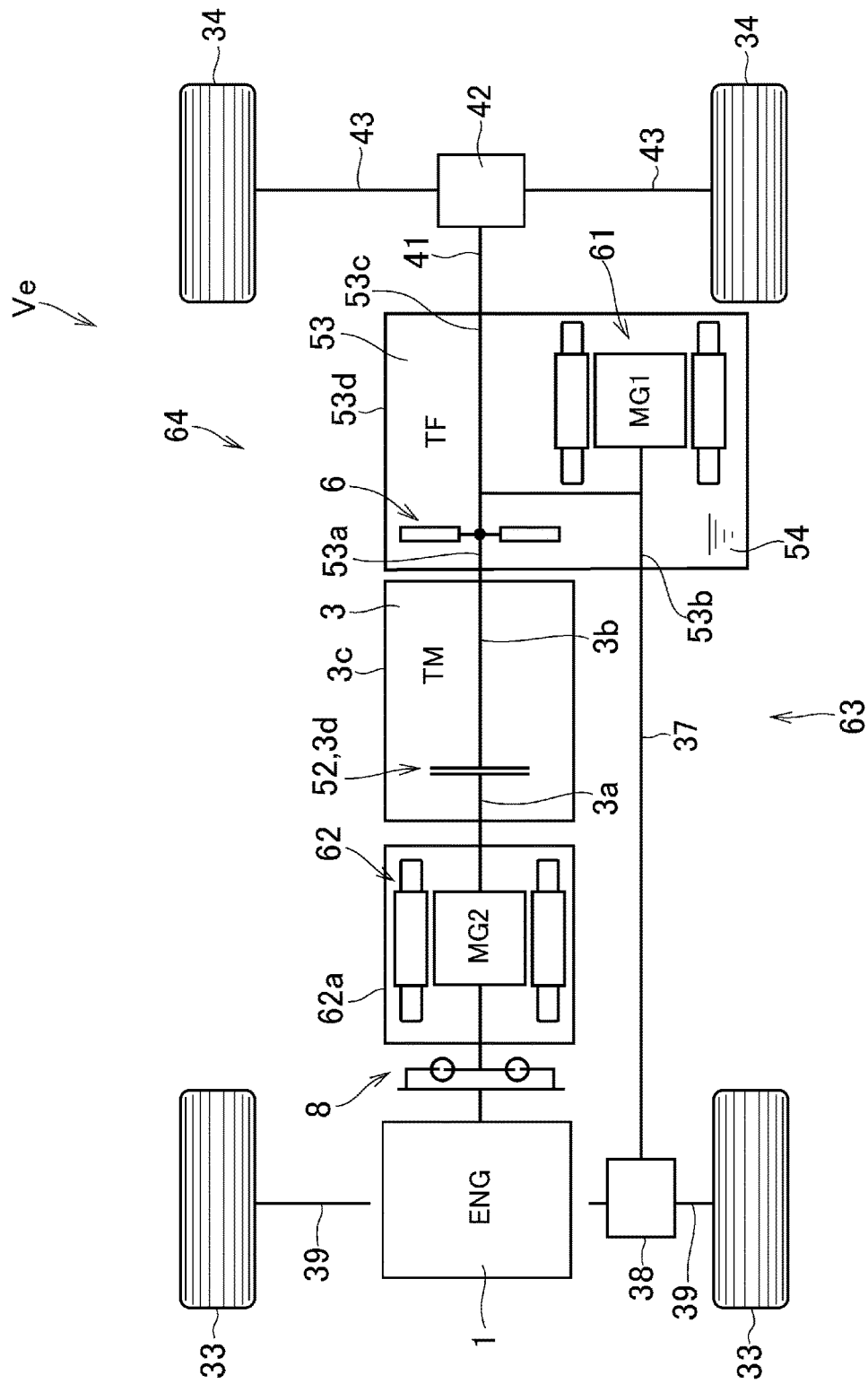
FIG. 12 is a schematic illustration showing a twelfth embodiment of the hybrid vehicle according to the present disclosure.

Turning to FIG. 12, there is shown the twelfth embodiment of the present disclosure. According to the twelfth embodiment, the prime mover of the vehicle Ve includes the engine 1 and two motors.

According to the twelfth embodiment, specifically, the prime mover includes the engine 1, a first motor (referred to as "MG1" in FIG. 12) 61, and a second motor (referred to as "MG2" in FIG. 12) 62. According to the twelfth embodiment, therefore, the vehicle Ve may be powered by both of the first motor 61 and the second motor 62 in the electric vehicle mode.

The first motor 61 as a motor-generator is disposed on the output side of the engine 1. For example, a permanent magnet type synchronous motor, and an induction motor may also be adopted as the first motor 61. As the aforementioned motor 51, the first motor 61 is also installed in the transfer 53.

The second motor 62 as a motor-generator is also disposed on the output side of the engine 1 while being connected to the engine 1 through the spring damper 8. For example, a permanent magnet type synchronous motor, and an induction motor may also be adopted as the second motor 62. Optionally, the disconnecting clutch 52 and the pendulum damper may be arranged in a motor case 62a of the second motor 62.

According to the twelfth embodiment, a first power transmission path 63 is formed between the engine 1 and the pair of front wheels 33 thorough the second motor 62, the transmission 3, the first motor 31, the transfer 53, the front propeller shaft 37, the front differential gear unit 38, and the front driveshaft 39. On the other hand, a second power transmission path 64 is formed between the engine 1 and the pair of rear wheels 34 thorough the second motor 62, the transmission 3, the first motor 31, the transfer 53, the rear propeller shaft 41, the rear differential gear unit 42, and the rear driveshaft 43.

Thus, in the vehicle Ve shown in FIG. 12, the first power transmission path 63 is formed between the engine 1 and the pair of front wheels 33, and the second power transmission path 64 is formed between the engine 1 and the pair of rear wheels 34.

In addition, in the vehicle Ve as a four-wheel drive having the transfer 53, the first motor 61 is disposed on the power transmission path closer to the drive wheels than the disconnecting clutch 52, and the second motor 62 is disposed on the power transmission path closer to the drive wheels than the disconnecting clutch 52.

Specifically, in the first power transmission path 63, the first motor 61 is situated closer to the front wheels 33 than the disconnecting clutch 52 (or the clutch 3d), and in the second power transmission path 64, the first motor 61 is situated closer to the rear wheels 34 than the disconnecting clutch 52 (or the clutch 3d). On the other hand, in the first power transmission path 63, the second motor 62 is situated closer to the engine 1 than the disconnecting clutch 52 (or the clutch 3d), and in the second power transmission path 64, the second motor 62 is situated closer to the engine 1 than the disconnecting clutch 52 (or the clutch 3d).

In any of the eleventh and the twelfth embodiments, the pendulum damper 6 is held in the transfer case 53d on the opening side of the transfer case 53d while being connected to the input shaft 53a. For this reason, the pendulum damper 6 may be fitted easily into the transfer case 53d.

Figure 13:
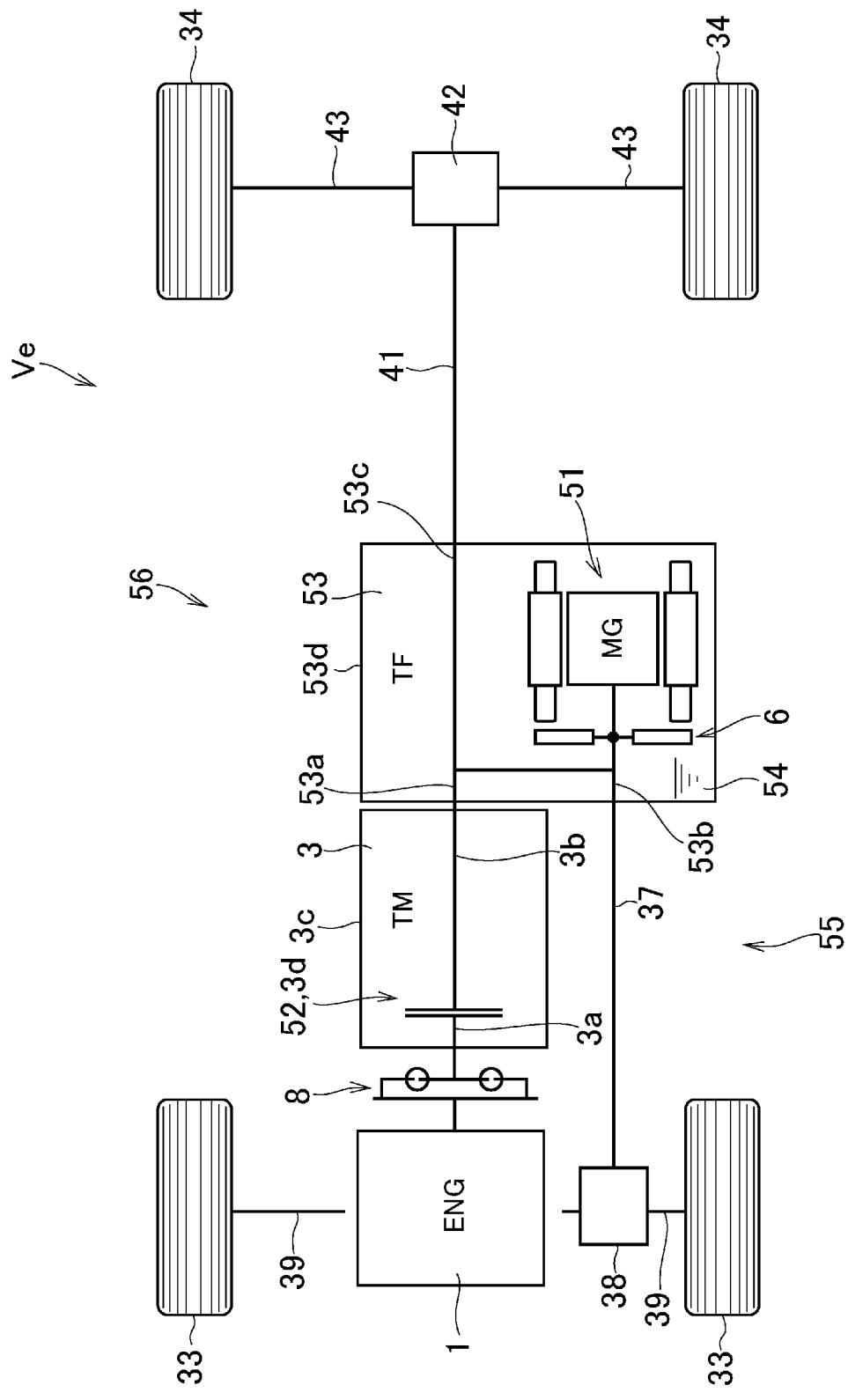
FIG. 13 is a schematic illustration showing a thirteenth embodiment of the hybrid vehicle according to the present disclosure.
Figure 14:
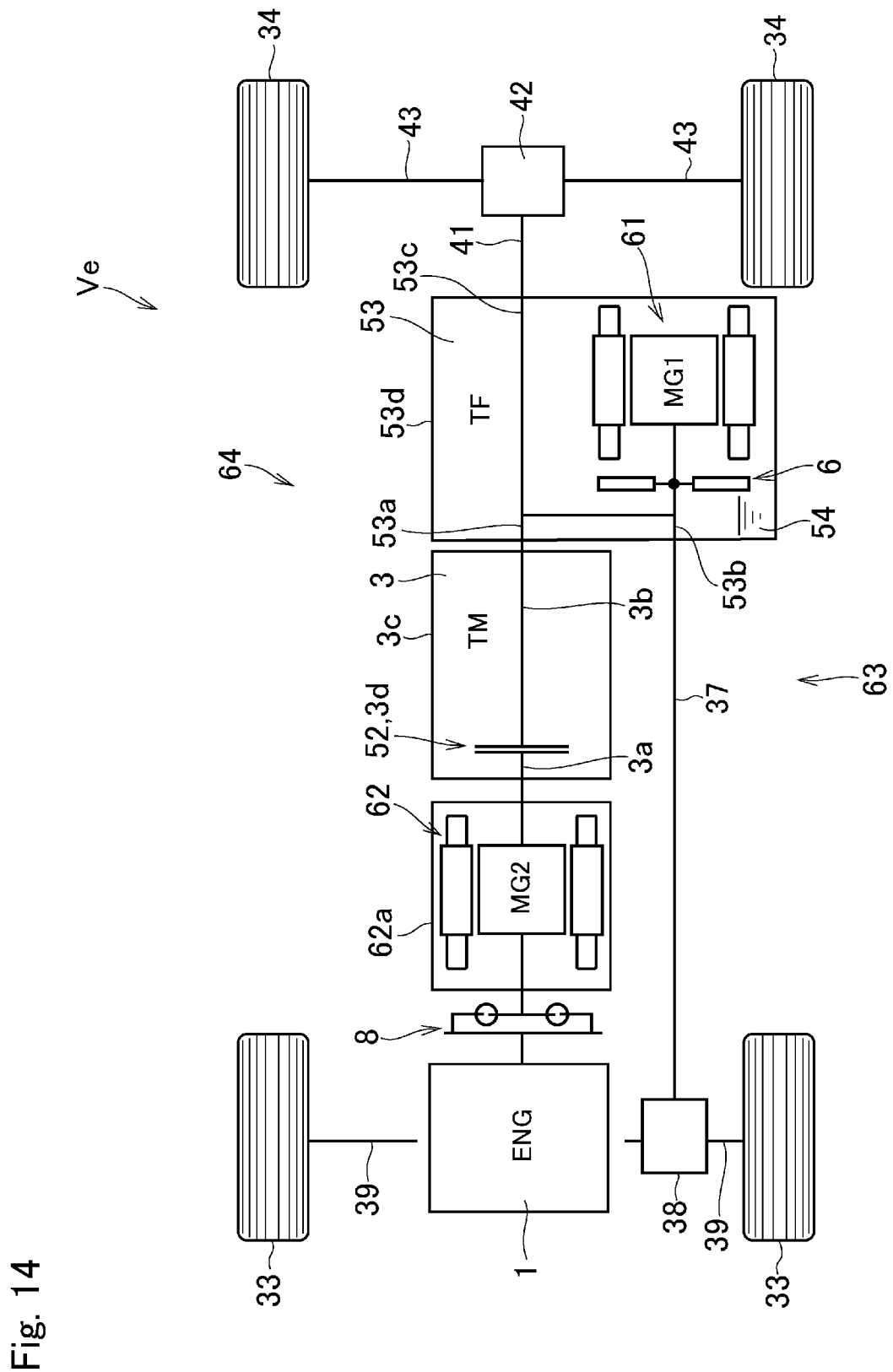
FIG. 14 is a schematic illustration showing a fourteenth embodiment of the hybrid vehicle according to the present disclosure.

As shown in FIG. 13, according to the thirteenth embodiment, the pendulum damper 6 may also be arranged in the transfer case 53d on the output side of the motor 51, that is, on the opening side of the transfer case 53d while being connected to the front output shaft 53b or the motor 51. Further, according to the fourteenth embodiment shown in FIG. 14, the pendulum damper 6 may also be arranged in the transfer case 53d on the output side of the first motor 61, that is, on the opening side of the transfer case 53d while being connected to the front output shaft 53b or the first motor 61.

Thus, the pendulum damper 6 is held in the transfer case 53d on the opening side of the transfer case 53d in the thirteenth and the fourteenth embodiments. For this reason, the pendulum damper 6 may also be fitted easily into the transfer case 53d.

According to any of the thirteenth and the fourteenth embodiments, the pendulum damper 6 is arranged coaxially with the motor 51 or the first motor 61. Each of the motor 51 and the first motor 61 serves individually as a prime mover of the vehicle Ve. For this purpose, a motor having a relatively large outer diameter is used as the motor 51 and the first motor 61 respectively so as to generate large drive torque. For example, in the thirteenth embodiment, an outer diameter of the motor 51 is larger than an outer diameter of the transmission 3 at a portion connected to the transfer 53. For this reason, dimensions of a lower upper portion of the transfer case 53d in FIG. 13 holding the motor 51 therein is larger than that of an upper portion of the transfer case 53d in FIG. 13 connected to the transmission 3. Likewise, in the fourteenth embodiment, an outer diameter of the first motor 61 is larger than the outer diameter of the transmission 3 at the portion connected to the transfer 53. For this reason, dimensions of the lower upper portion of the transfer case 53d in FIG. 14 holding the first motor 61 therein is larger than that of the upper portion of the transfer case 53d in FIG. 14 connected to the transmission 3. According to the thirteenth and the fourteenth embodiments, therefore, an outer diameter of the pendulum damper 6 may be increased in comparison with that of a case in which the pendulum damper 6 is arranged on the side connected to the transmission 3. That is, design flexibility of the pendulum damper 6 may be increased. For this reason, vibration damping performance of the pendulum damper 6 may be increased.

Although the above exemplary embodiments of the present disclosure have been described, it will be understood by those skilled in the art that the present disclosure should not be limited to the described exemplary embodiments, and various changes and modifications can be made within the scope of the present disclosure.

What is claimed is:

1. A hybrid vehicle, in which a prime mover includes an engine and at least one motor, comprising:
   a drive wheel;
   a power transmission path from the engine to the drive wheel via the motor;

a pendulum damper that is arranged on the power transmission path to absorb torsional vibrations on the power transmission path; and
a disconnecting clutch that is arranged on the power transmission path to selectively interrupt power transmission between the engine and the pendulum damper,
wherein the motor includes a motor case holding a motor oil for lubricating at least the motor,
the pendulum damper is arranged in the motor case together with at least the motor, and
the motor oil lubricates the pendulum damper.

2. The hybrid vehicle as claimed in claim 1,
wherein the motor includes a coil end as a portion of a coil protruding in an axial direction from an axial end of a stator of the motor, and
the pendulum damper is held in an inner circumferential space of the coil end.

3. A hybrid vehicle, in which a prime mover includes an engine and at least one motor, comprising:
a drive wheel;
a power transmission path from the engine to the drive wheel via the motor;
a pendulum damper that is arranged on the power transmission path to absorb torsional vibrations on the power transmission path; and
a disconnecting clutch that is arranged on the power transmission path to selectively interrupt power transmission between the engine and the pendulum damper,
wherein the motor includes a motor case holding a motor oil for lubricating at least the motor, and
the disconnecting clutch is arranged in the motor case together with at least the motor.

4. The hybrid vehicle as claimed in claim 3,
wherein the motor includes a rotor, and
the disconnecting clutch is arranged in a hollow space of the rotor.

5. A hybrid vehicle, in which a prime mover includes an engine and at least one motor, comprising:
a drive wheel;
a power transmission path from the engine to the drive wheel via the motor;
a pendulum damper that is arranged on the power transmission path to absorb torsional vibrations on the power transmission path; and
a disconnecting clutch that is arranged on the power transmission path to selectively interrupt power transmission between the engine and the pendulum damper,
and
the hybrid vehicle further comprising:
a transmission that is arranged on the power transmission path to transmit torque to the drive wheel with a predetermined speed ratio, and that is selectively brought into neutral stage,
wherein the transmission includes a clutch that is selectively engaged and disengaged to establish the predetermined speed ratio and the neutral stage, and
the transmission serves as the disconnecting clutch.

6. A hybrid vehicle, in which a prime mover includes an engine and at least one motor, comprising:
a drive wheel;
a power transmission path from the engine to the drive wheel via the motor;
a pendulum damper that is arranged on the power transmission path to absorb torsional vibrations on the power transmission path; and
a disconnecting clutch that is arranged on the power transmission path to selectively interrupt power transmission between the engine and the pendulum damper,
wherein the drive wheel includes a pair of front wheels and a pair of rear wheels,
the hybrid vehicle further comprises a transfer that is disposed on the power transmission path,
the transfer is adapted to switch a drive mode between two-wheel drive mode in which a drive torque is delivered to any one of the pairs of the front wheels and the rear wheels and four-wheel drive mode in which a drive torque is delivered to both pairs of the front wheels and the rear wheels, or to fix the drive mode to the four-wheel drive mode, and
the power transmission path includes a first power transmission path from the engine to the front wheels via the transfer, and a second power transmission path from the engine to the rear wheels via the transfer,
wherein the transfer includes a transfer case holding a transfer oil for lubricating and cooling at least the transfer, and
the motor is held in the transfer case together with at least the transfer,
wherein the pendulum damper is held in the transfer case together with at least the transfer and the motor, and
the transfer oil lubricates the pendulum damper.

7. The hybrid vehicle as claimed in claim 5,
wherein the motor includes at least a first motor and a second motor,
the first motor is arranged on the power transmission path closer to the drive wheel than the disconnecting clutch, and
the second motor is arranged on the power transmission path closer to the engine than the disconnecting clutch or closer to the drive wheel than the first motor.

8. A hybrid vehicle, in which a prime mover includes an engine and at least one motor, comprising:
a drive wheel;
a power transmission path from the engine to the drive wheel via the motor;
a pendulum damper that is arranged on the power transmission path to absorb torsional vibrations on the power transmission path; and
a disconnecting clutch that is arranged on the power transmission path to selectively interrupt power transmission between the engine and the pendulum damper,
wherein number of oscillations of an oscillating member of the pendulum damper per revolution is set in accordance with a first vibration order of the motor governed by a number of poles of the motor.

* * * * *